United States Patent [19]

Berg et al.

[11] Patent Number: 5,561,909
[45] Date of Patent: Oct. 8, 1996

[54] BATTERY OPERATED SAW

[76] Inventors: Donald N. E. Berg, 359 Via Hermosa, West Palm Beach, Fla. 33415; James R. Headberg, 15310 Take Off Pl., Aero Club of the Landings, West Palm Beach, Fla. 33414

[21] Appl. No.: 494,697

[22] Filed: Jun. 26, 1995

[51] Int. Cl.⁶ .................................................. B23D 49/16
[52] U.S. Cl. .................... 30/392; 30/277.4; 74/50
[58] Field of Search .......................... 30/392, 393, 394, 30/277.4; 74/25, 47, 48, 52, 50

[56] References Cited

U.S. PATENT DOCUMENTS

| | | | |
|---|---|---|---|
| 2,206,614 | 7/1940 | O'hern | 30/392 |
| 2,639,737 | 5/1953 | Forsberg | 30/392 |
| 2,764,188 | 9/1956 | Hoffman | 30/392 |
| 3,642,002 | 2/1972 | Otterstrom | 30/392 |
| 3,901,117 | 8/1975 | Hoffman | 30/392 X |
| 4,555,849 | 12/1985 | Ando et al. | 30/388 |
| 4,693,009 | 9/1987 | Bone | 30/392 |
| 4,836,069 | 6/1989 | Tran Dinh | 30/392 X |
| 4,949,464 | 8/1990 | Adomatis | 30/392 X |
| 5,303,478 | 4/1994 | Gugel | 30/392 |

*Primary Examiner*—Hwei-Siu Payer
*Attorney, Agent, or Firm*—Sixbey, Friedman, Leedom & Ferguson

[57] ABSTRACT

The electrically operated reciprocating tool includes a housing with a counterbalanced single throw crankshaft mounted for rotation within the housing. The crankshaft rotates on a central shaft, and includes a weighted counterbalance section extending radially on an opposite side of the shaft and is pivotally connected to one end of an elongate drive link. The opposite end of the drive link is pivotally connected to a reciprocable unit mounted for movement in a raceway formed in the housing. A battery powered drive unit mounted in the housing is connected to rotate the crankshaft.

18 Claims, 3 Drawing Sheets

BATTERY OPERATED SAW

FIELD OF THE INVENTION

The present invention relates to power tools generally and more particularly to a cordless, battery powered electric power tool which develops a powerful reciprocating action from a limited DC power source.

BACKGROUND OF THE INVENTION

In recent years, the development of small, powerful, battery powered electric motors has led to the production of a number of diverse, cordless tools. Attempts have been made to design cordless power saws, but a number of previously insurmountable problems have limited cordless power saw development to small coping and saber saws of the types shown by U.S. Pat. Nos. 4,555,849 to Ando et al. and 4,949,464 to Adomatis.

A powerful, cordless hand saw capable of cutting metal, hard wood, plastic or other hard objects must have a reciprocal stroke which is much longer than the short, vibratory stroke of smaller coping and saber saws. Most high torque rotary drive motors generally rotate at speeds which are too fast to permit a smooth transition to a relatively long stroke, reciprocal motion without creating considerable vibration which is undesirable in a hand saw. Additionally, this transition must be effectively made within a very limited area to control the size and bulk of the resultant tool.

SUMMARY OF THE INVENTION

It is a primary object of the present invention to provide a novel and improved battery powered reciprocable drive unit for a power tool which converts energy from a high torque rotary power source to a smooth reciprocal motion with minimal vibration.

Another object of the present invention is to provide a novel and improved battery powered reciprocal drive unit for a power tool which includes a single throw counterbalanced crankshaft driven by a rotary power source. The crankshaft drives a pivotally connected drive shaft having an outer end pivotally connected to a driven member which reciprocates within a raceway.

A further object of the present invention is to provide a novel and improved battery operated saw which is powered by a high torque rotary electric motor. A double reduction planetary drive is connected between the motor and a counterbalanced single throw crankshaft which drives a connecting rod or link attached to a reciprocating drive member. One end of a saw blade is connected to the drive member and the opposite end of the saw blade is connected to a holder mounted for reciprocation within a raceway.

A still further object of the present invention is to provide a novel and improved battery operated saw wherein the rotary power from a high torque electric motor is converted with minimal vibration to a long stroke, reciprocal motion for driving a saw blade.

These and other objects of the present invention are achieved by providing a saw having an enclosed power assembly housing with a hand grip handle extending outwardly from one side thereof. A blade support frame extends outwardly from the opposite side of the power assembly housing and defines a gap therewith which is bridged by a reciprocatory saw blade. A first end of the saw blade is secured to a holder which is mounted for reciprocal movement with a raceway in the blade support frame.

The power assembly housing encloses batteries connected through a power switch on the hand grip handle to a high torque DC motor mounted within the housing. The rotary output of this motor drives a double reduction planetary drive unit which provides a rotary drive at reduced speed to a counterbalanced single throw crankshaft. This crankshaft has two spaced identical halves held together by a pin which extends through one end of a drive rod or link. This pin is eccentrically positioned relative to the central axis of the crankshaft, and as the crankshaft rotates about the central axis, the pin drives the drive rod which passes between the spaced halves of the crankshaft. The outermost end of the drive rod is connected to a second blade holder which is reciprocated thereby in a straightline raceway formed in the power assembly housing. The remaining end of the saw blade is attached to this second blade holder and is driven thereby.

DESCRIPTION OF THE PREFERRED EMBODIMENTS

Figure 1:
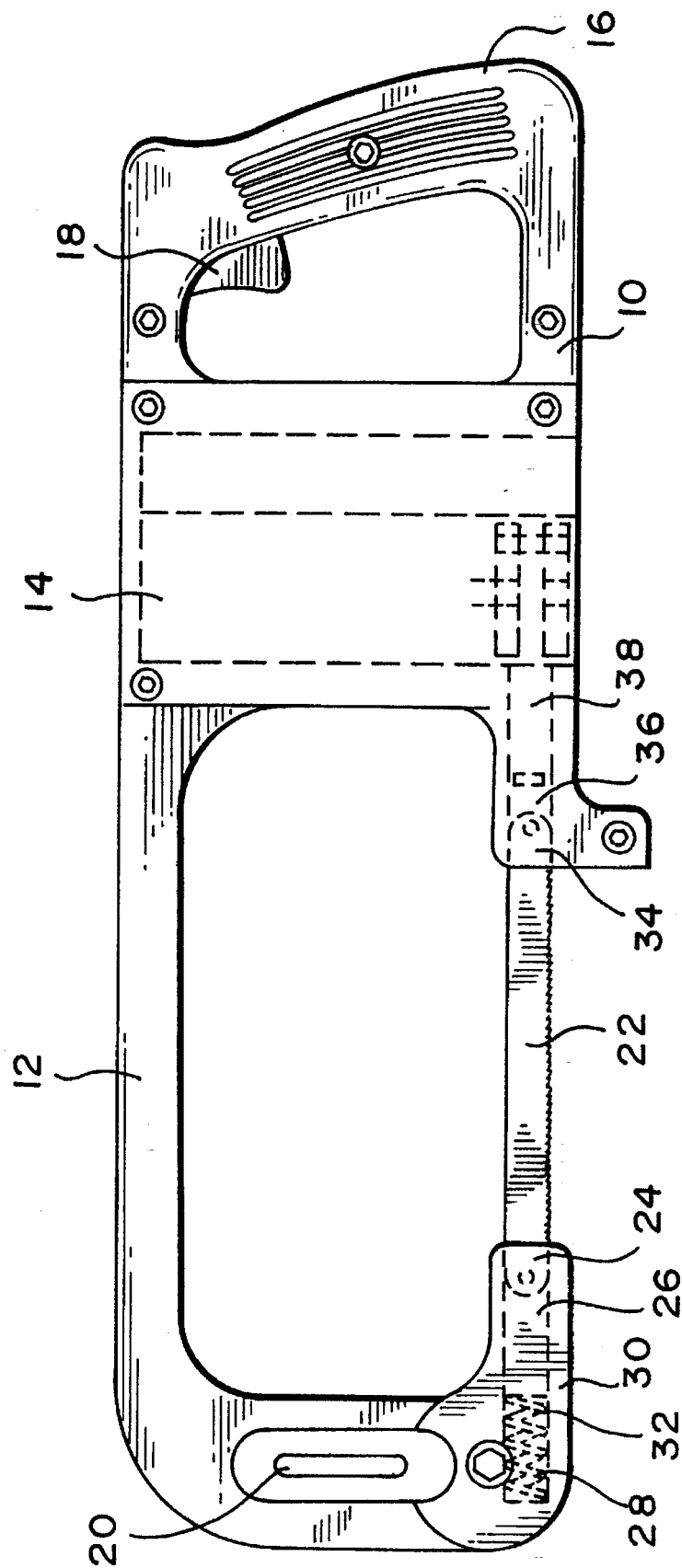
FIG. 1 is a view in side elevation of the battery operated saw of the present invention.
Figure 2:
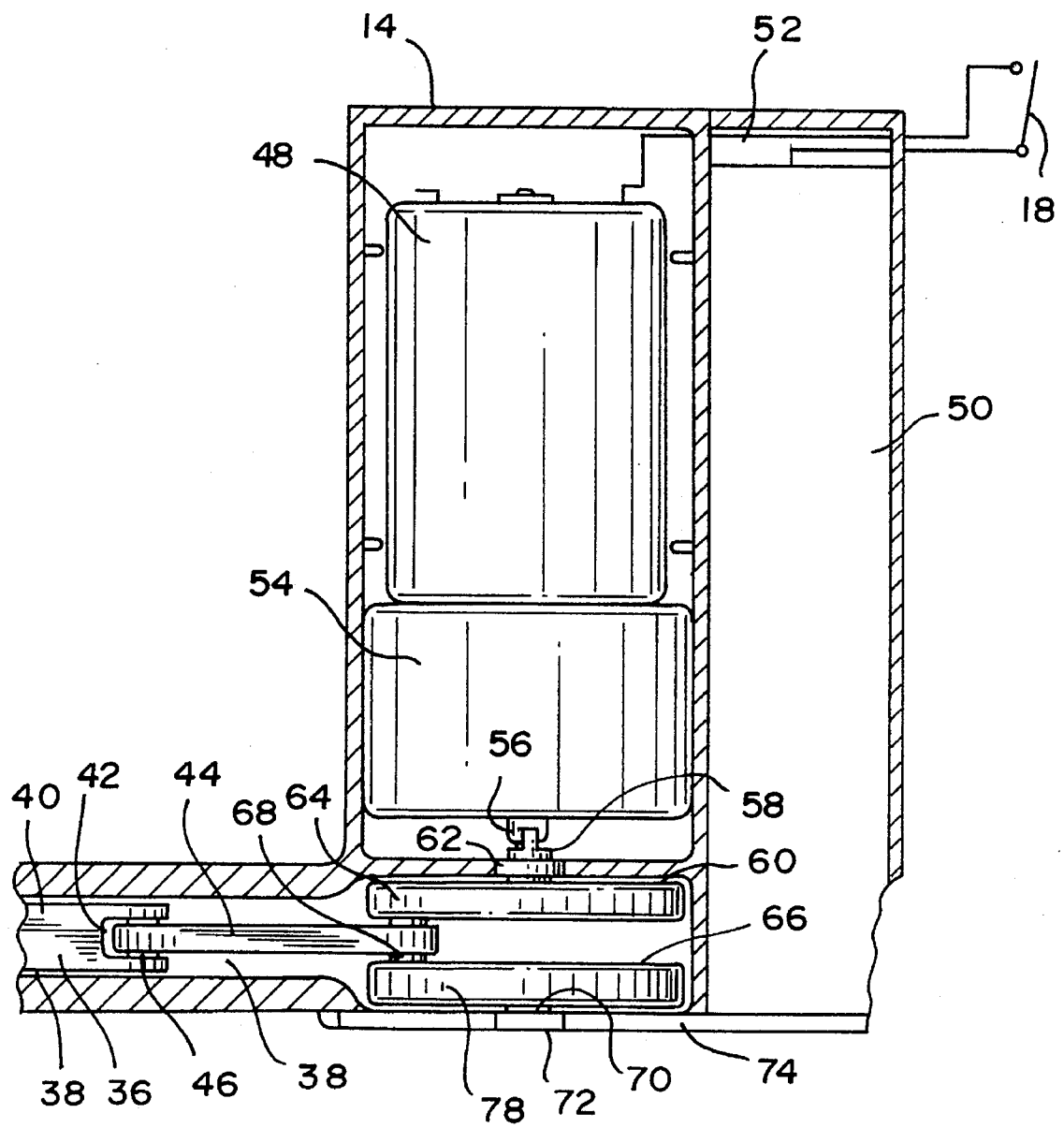
FIG. 2 is a cross sectional view of the power assembly housing of FIG. 1.
Figure 3:
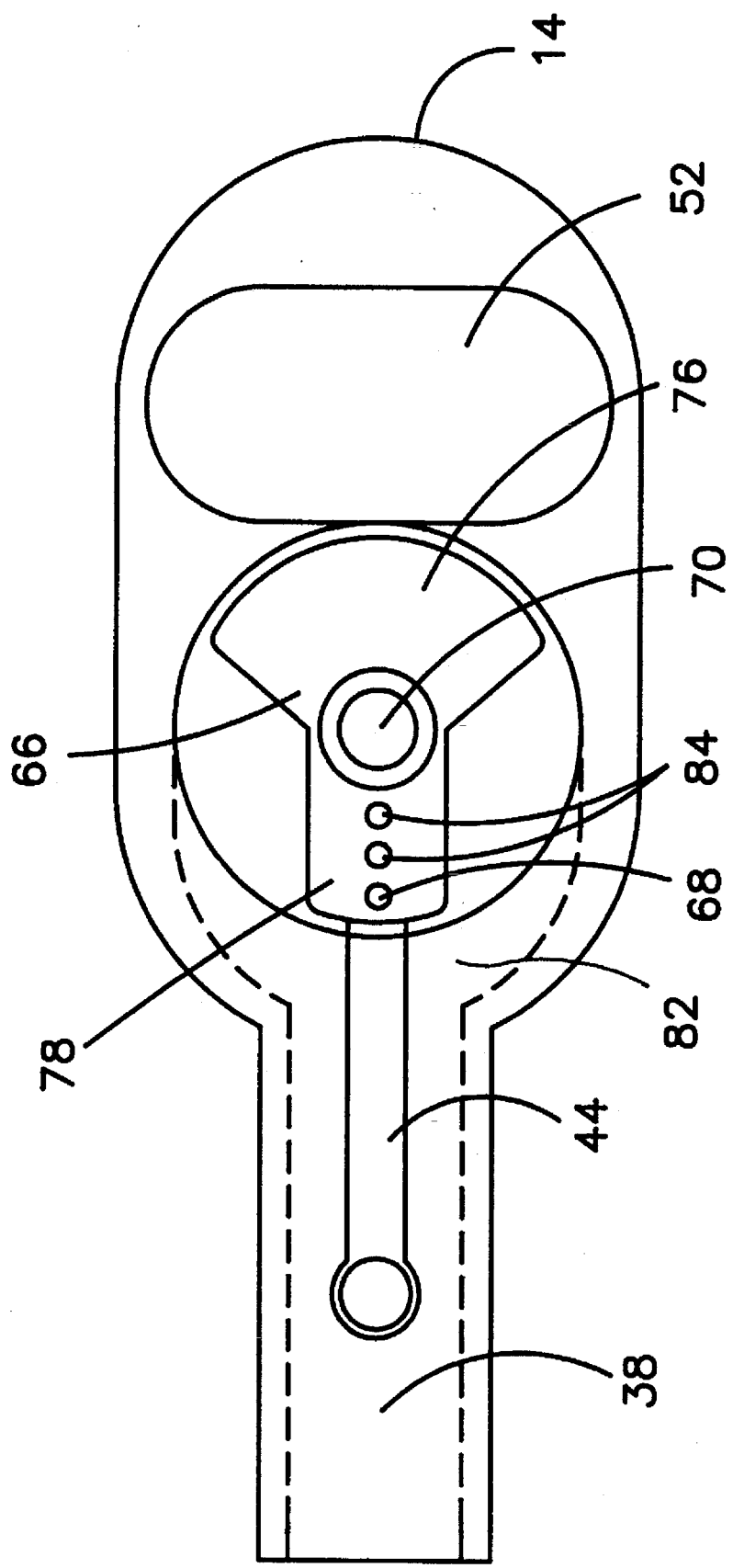
FIG. 3 is a bottom plan view of the power assembly housing showing the counterbalanced single throw crankshaft of FIG. 2.

Referring now to the drawings, the battery operated saw of the present invention includes a main frame 10 which supports a power assembly housing 14 having a hand grip handle 16 extending outwardly from one side thereof and a support extension frame 12 which supports the distal end components of the saw. A power switch 18 for activating the saw is mounted on the handle 16. The support extension frame 12 defines a second hand grip 20 opposite to the handle 16 and spaced from the power assembly housing 14.

The power assembly housing and support extension frame define a gap which is bridged by a saw blade 22. The distal end 24 of the saw blade is secured to a first blade holder 26 which is mounted for reciprocation within a raceway 28 formed in a blade receiving section 30 of the support extension frame 12. The blade holder 26 may be spring biased by a spring 32.

The proximal end 34 of the blade 22 is secured to a second blade holder 36 mounted for reciprocation within a raceway 38 within the power assembly housing 14 which is longitudinally aligned with the raceway 28. This second blade holder has an inner end 40 which is slotted at 42 to receive a drive rod or link 44. A pin 46 which extends through the slotted inner end of the second blade holder mounts one end of the drive rod for pivotal movement in the slot 42.

The power assembly housing 14 encloses a DC electric motor 48 which is powered by batteries 50 mounted in a battery compartment 52. The power from the batteries is provided to the motor 48 under the control of the power switch 18. The motor is designed to meet the power requirements of the type of work to be accomplished with the saw 10, but for example, a 7.2 volt, 14,700 RPM motor which drives a double reduction planetary drive unit 54, having a 26 to 1 reduction ratio has been found to be effective. By attaching a double speed reduction planetary drive unit to the output shaft of the motor 48, the high speed output of the motor is converted to a lower speed with increased torque at the output shaft 56 of the double reduction planetary drive unit 54.

The output shaft 56 is splined to an upper stub shaft 58 for a counterbalanced single throw crankshaft 60. This upper stub shaft 58 is mounted for rotation in an upper crankshaft bearing 62 mounted on the power assembly housing 14. The counterbalanced single throw crankshaft 60 includes identical top and bottom sections 64 and 66 respectively which are superimposed and joined in spaced relationship by an eccentrically positioned pin 68. The upper stub shaft 58 is secured to the upper crankshaft section 64, and a lower stub shaft 70 which is longitudinally aligned with the upper stub shaft 58 is secured to the lower crankshaft section 66. The upper and lower crankshaft sections 64, 66 define arcs of a circle at the center of which are the upper and lower stub shafts 58, 70. The lower stub shaft 70 is mounted for rotation in a lower crankshaft bearing 72 which is mounted on a cover 74 secured to the power assembly housing 14.

The upper and lower crankshaft sections 64 and 66 are identical, and each include an arcuate counterweight segment 76 which extends outwardly on one side of a stub shaft 58 or 70 and a narrower connection segment 78 which is centered relative to the arcuate counterweight segment and which extends radially to the circumference of a circle defined by the arc of the counterweight segment from the opposite side of the central stub shaft. The upper and lower crankshaft sections 64, 66 are superimposed, and the pin 68 extends between the outer end portions of connection segments 78 of the upper and lower crankshaft sections 64, 66.

One end of the drive rod 44 is pivotally mounted on the pin 68 between the upper and lower crankshaft sections 64 and 66 and, as previously described, the remaining end of the drive rod is pivotally mounted on the pin 46 at the slotted end of the second blade holder 36. The counterbalanced single throw crankshaft 60 is mounted for rotation in a circular compartment 80 in the power assembly housing 14, and a wide, arcuate opening 82 at the periphery of the circular compartment 80 permits the drive rod 44 to extend into the raceway 38. The opening 82 is of sufficient width to permit the drive rod 44 to change to different angular positions during rotation of the counterbalanced single throw crankshaft 60, and the slotted end 42 of the second blade holder 36 facilitates these angular position changes has the drive rod 44 reciprocates the second blade holder 36 longitudinally in the raceway 38. The drive rod 44 is permitted to pass between the upper and lower crankshaft sections 64 and 66 as the counterbalanced single throw crankshaft 60 rotates.

The counterbalanced single throw crankshaft 60 with the arcuate counterweight segments 76 which are weighted to counterbalance the connection segments 78, the drive rod 44, the blade holders 26 and 36 and the blade 22, develops a powerful reciprocal action from a very limited power source in a very compact space. There is virtually no vibration caused by the reciprocating action of the saw because vibration is absorbed in the rotary action of the counterbalanced crankshaft 60. There is also no thrust on the motor 48 or the planetary drive unit 54 to the manner in which the crankshaft 60 is mounted with the drive rod 44 extending in a plane perpendicular to the stub shafts 58 and 70.

The stroke of the saw blade 22 provided by the counterbalanced single throw crankshaft 60 is not a short, vibratory stroke but may be several inches in length. The length of this stroke can be adjusted by varying the radial distance of the pin 68 from the upper and lower stub shafts 58 and 70. This adjustment can be made permanently, or could be changed by threading the pin 68 into one of a plurality of aligned threaded apertures 84 in the connection segments 78.

We claim:

1. An electrically operated reciprocating tool comprising:

a housing;

a counterbalanced single throw crankshaft mounted for rotation within said housing, said crankshaft including a shaft means mounted upon and supported by said housing, said shaft means having a central longitudinal axis, a weighted counterbalance section extending radially on one side of said shaft means, a connection segment extending radially on a side of said shaft means opposite to said counterbalance section, and a drive rod having a first end pivotally connected to said connection segment in spaced relation to said shaft means, said drive rod having a second end spaced from said first end;

an elongate raceway formed in said housing for defining a path of movement;

a reciprocable unit mounted for travel along said raceway, the second end of said drive rod being connected to said reciprocable unit; and drive means mounted in said housing for rotating said counterbalanced single throw crankshaft, said drive means having a drive shaft connected to said shaft means for said crankshaft and aligned with the central longitudinal axis thereof.

2. The electrically operated reciprocating tool of claim 1 which includes a first shaft bearing mounted in said housing, a second shaft bearing mounted in said housing in alignment and in spaced relationship with said first shaft bearing, said crankshaft shaft means being mounted for rotation in said first and second shaft bearings to support said counterbalanced single throw crankshaft between said first and second shaft bearings in said housing.

3. An electrically operated reciprocating tool comprising:

a housing;

a counterbalanced single throw crankshaft mounted for rotation within said housing, said crankshaft including a shaft means, a weighted counterbalance section extending radially on one side of said shaft means, a connection segment extending radially on a side of said shaft means opposite to said counterbalance section, and a drive rod having a first end pivotally connected to said connection segment in spaced relation to said shaft means, said drive rod having a second end spaced from said first end;

an elongate raceway formed in said housing for defining a path of movement;

a reciprocable unit mounted for travel along said raceway, the second end of said drive rod being connected to said reciprocable unit; and drive means mounted in said housing for rotating said counterbalanced single throw crankshaft, said drive means including an electric motor, a speed reducing planetary drive unit connected to be driven by said electric motor, said speed reducing planetary drive unit being connected to the shaft means of said counterbalanced single throw crankshaft.

4. An electrically operated reciprocating tool comprising:

a housing;

a counterbalanced single throw crankshaft mounted for rotation within said housing, said counterbalanced single throw crankshaft including a shaft means, a weighted counterbalance section extending radially on one side of said shaft means including, substantially identical top and bottom sections with said top section being superimposed in spaced relationship relative to said bottom section, said top and bottom sections each including a counterweight segment to form the counterbalance section of said counterbalanced single throw crankshaft, a connection segment formed by a radial extension extending radially on a side of said shaft means opposite to said counterbalance section and a drive rod having a first end pivotally connected to said connection segment in spaced relation to said shaft means, said drive rod having a second end spaced from said first end, said top and bottom sections being connected in spaced, superimposed relationship by a connection pin extending between the radial extensions thereof, the first end of said drive rod being pivotally connected to said connection pin, an elongate raceway formed in said housing for defining a path of movement;

a reciprocable unit mounted for travel along said raceway, the second end of said drive rod being connected to said reciprocable unit; and drive means mounted in said housing for rotating said counterbalanced single throw crankshaft.

5. The electrically operated reciprocating tool of claim 4, wherein said drive means includes an electric motor, a speed reducing planetary drive unit connected to be driven by said electric motor, said speed reducing planetary drive unit being connected to the shaft means of said counterbalanced single throw crankshaft.

6. The electrically operated reciprocating tool of claim 5 wherein said counterbalanced single throw crankshaft top and bottom sections each include a stub shaft mounted for rotation in said housing, the stub shafts of said top and bottom sections forming said shaft means and being longitudinally aligned, the stub shaft of said top section being connected to said planetary drive unit.

7. The electrically operated reciprocating tool of claim 6 wherein the counterweight segments of said top and bottom sections are arcuate in configuration with an outermost edge which forms an arc of a circle, said stub shafts extending outwardly from said top and bottom sections at the center of said circle and said radial extensions extending radially outward from said respective stub shafts to the circumference of said circle.

8. The electrically operated reciprocating tool of claim 7 wherein said drive rod extends outwardly from between said top and bottom sections in a plane substantially perpendicular to said stub shafts.

9. The electrically operated reciprocating tool of claim 8 wherein said drive means includes a DC battery power supply and a DC electric motor connected to said power supply.

10. A battery operated power saw comprising:

a housing shaft support means mounted in said housing;

a blade supporting frame extending outwardly from said housing and including a blade support section spaced from said housing to receive the distal end of a saw blade;

a counterbalanced single throw crankshaft mounted for rotation within said housing, said crankshaft including shaft means supported for rotation in said shaft support means, said shaft means having a central longitudinal axis, a weighted counterbalance section extending radially on one side of said shaft means, a connection segment extending radially on a side of said shaft means opposite to said counterbalance section, and an elongate drive link having a first end pivotally connected to said connection segment in spaced relation to said shaft means, said drive link having a second end spaced from said first end;

a first elongate raceway formed in said housing for defining a straight line path of movement;

a first reciprocable saw blade holder mounted for travel along said first raceway, the second end of said drive link being pivotally connected to said first saw blade holder;

a second elongate raceway formed in said blade support section of said blade supporting frame, said second elongate raceway being longitudinally aligned with said first elongate raceway;

a second blade holder mounted for travel along said second elongate raceway; and drive means mounted in said housing for rotating said counterbalanced single throw crankshaft, said drive means having a drive shaft connected to said shaft means and aligned with the central longitudinal axis thereof.

11. The battery operated power saw of claim 10 wherein said drive means includes a DC electric motor and a speed reducing planetary drive unit connected to be driven by said electric motor, said speed reducing planetary drive unit being connected to drive the shaft means of said counterbalanced single throw crankshaft.

12. The battery operated power saw of claim 11 wherein said counterbalanced single throw crankshaft includes substantially identical top and bottom sections with said top section being superimposed in spaced relationship relative to said bottom section, said top and bottom sections each including a counterweight segment to form the counterbalance section of said counterbalanced single throw crankshaft and a radial extension forming said connection segment, said top and bottom sections being connected in spaced, superimposed relationship by a connection pin extending between the radial extensions thereof, the first end of said drive link being pivotally connected to said connection pin.

13. The battery operated power saw of claim 12 wherein said counterbalanced single throw crankshaft top and bottom sections each include a stub shaft mounted for rotation in said housing, the stub shafts of said top and bottom sections forming said shaft means and being longitudinally aligned, the stub shaft of said top section being connected to said planetary drive unit.

14. The battery operated power saw of claim 13 wherein the counterweight segments of said top and bottom sections are arcuate in configuration with an outermost edge which forms an arc of a circle, said stub shafts extending outwardly from said top and bottom sections at the center of said circle and said radial extensions extending radially outward from said respective stub shafts to the circumference of said circle.

15. The battery operated power saw of claim 14 wherein said drive link extends outwardly from between said top and bottom sections in a plane substantially perpendicular to said stub shafts.

16. The battery operated power saw of claim 15 which includes a handle extending outwardly from said housing at a side opposite to said blade supporting frame, manually operable switch means mounted on said handle, a battery power supply mounted in said housing, and circuit means connecting said battery power supply to said DC motor through said switch means.

17. The battery operated power saw of claim 16 wherein said saw blade has a distal and a proximal end, the distal end of said saw blade being attached to said second blade holder and the proximal end being attached to said first blade holder.

18. The battery operated power saw of claim 10 wherein said shaft support means includes a first shaft bearing mounted in said housing, a second shaft bearing mounted in said housing in alignment and in spaced relationship with said first shaft bearing, said crankshaft shaft means being mounted for rotation in said first and second shaft bearings to support said counterbalanced single throw crankshaft between said first and second shaft bearings in said housing.

* * * * *